Sept. 20, 1932.  C. T. THORSSELL  1,878,733
PROCESS FOR THE PRODUCTION OF POTASSIUM NITRATE
Filed Aug. 7, 1930
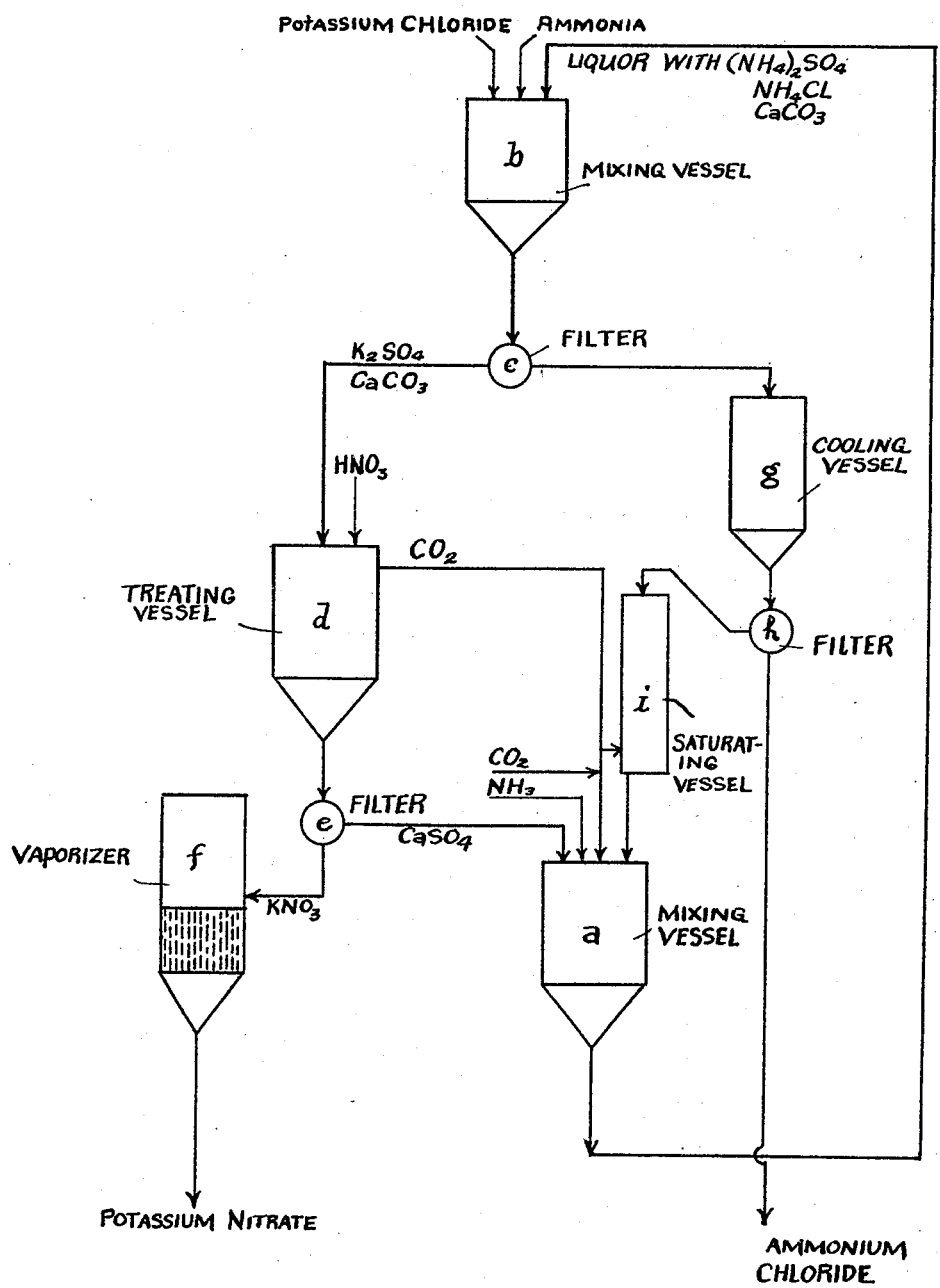
INVENTOR:
C. T. Thorssell
BY Marks & Clerk
ATTORNEYS.

Patented Sept. 20, 1932

1,878,733

UNITED STATES PATENT OFFICE

CARL THEODOR THORSSELL, OF KASSEL, GERMANY

PROCESS FOR THE PRODUCTION OF POTASSIUM NITRATE

Application filed August 7, 1930, Serial No. 473,777, and in Germany August 14, 1929.

One known method of producing potassium nitrate is the decomposition of potassium sulphate with calcium nitrate:

$$K_2SO_4 + Ca(NO_3)_2 = 2KNO_3 + CaSO_4.$$

The gypsum formed is separated from the potassium nitrate solution by decantation or filtration, and the potassium nitrate solution obtained is evaporated.

This method of making potassium nitrate appears very simple and promising, but serious obstacles stand in its way.

In the first place the reaction does not proceed so simply as is to be assumed from the above equation, since not only gypsum but double compounds of potassium and calcium with sulphuric acid also form, such as syngenite ($K_2SO_4,CaSO_4.H_2O$) and potassium pentacalcium sulphate ($K_2SO_4.5CaSO_4.H_2O$). In this way loss of potassium occurs, which makes the process more expensive and renders it less profitable or unprofitable.

A further obstacle is that potassium sulphate in itself is a too valuable raw material for the manufacture of potassium nitrate, more particularly when the potassium nitrate is to be used as fertilizer.

The invention describes a process by means of which the utilization of the above reaction for the production of potassium nitrate is rendered possible with out said disadvantages.

According to the present invention not potassium sulphate but potassium chloride is used as raw material. The invention describes a self-contained cyclic process in which potassium chloride, nitric acid, carbonic acid and ammonia are introduced as raw materials and potassium nitrate and ammonium chloride are withdrawn as finished products.

The process is carried out as follows:

Into an ammonium chloride solution obtained in the process and containing ammonium sulphate a quantity of potassium chloride equivalent to the ammonium sulphate is stirred and ammonia is led in. Potassium sulphate forms as a precipitate in an ammoniacal ammonium chloride solution. The potassium sulphate is separated from the mother liquor and stirred up with nitric acid and calcium carbonate originating in the process, whereby gypsum containing potassium sulphate and a potassium nitrate solution are formed. These are separated by decantation or filtration and the solution is evaporated in order to obtain solid potassium nitrate.

Instead of evaporating the potassium nitrate solution, it may be cooled down in order to separate out the greater part of the potassium nitrate and the mother liquor used for the dissolution of further newly obtained quantities of potassium sulphate.

The mother liquor from the potassium sulphate containing nitric acid is cooled, in order to separate out a part of the ammonium chloride, and after separation of this is saturated with carbonic acid for forming ammonium carbonate.

Into this ammonium carbonate-ammonium chloride solution is stirred the gypsum containing potassium sulphate obtained in the production of potassium nitrate, which is thereby converted into ammonium sulphate and calcium carbonate. This solution is the ammonium chloride solution containing ammonium sulphate mentioned in the introduction into which the potassium chloride is stirred while ammonia is led in, whereby fresh quantities of potassium sulphate are formed.

It is not necessary to remove the calcium carbonate from the ammonium chloride solution containing ammonium sulphate, for the potassium sulphate is to be mixed with the calcium carbonate before the disintegration with nitric acid.

A flow sheet is here given to better explain the process and to which the following description refers:

Gypsum obtained from the process is stirred up in the vessel $a$ with a solution containing ammonium carbonate and ammonium chloride also obtained from the process. The gypsum is converted according to the equation:

$$CaSO_4 + (NH_4)_2CO_3 = (NH_4)_2SO_4 + CaCO_3$$

into ammonium sulfate and calcium carbonate.

Potassium chloride is stirred in vessel $b$ with the said liquor containing undissolved calcium carbonate and ammonia is introduced, the potassium chloride being converted according to the equation:

$$2KCl + (NH_4)_2SO_4 = K_2SO_4 + 2NH_4Cl$$

into potassium sulfate and ammonium chloride. Owing to the presence of free ammonia, the potassium sulfate that is formed settles at the bottom for which reason a precipitate is obtained which consists of potassium sulfate and calcium carbonate. This precipitate is separated from the mother liquor in the filter $c$ and is treated in the vessel $d$ with nitric acid, the following reaction taking place:

$$K_2SO_4 + CaCO_3 + 2HNO_3 = CaSO_4 + 2KNO_3 + H_2O + CO_2.$$

The undissolved gypsum is filtered off in filter $e$ and returns to the process while the liquor which contains potassium nitrate is vaporized in vessel $f$ for obtaining solid potassium nitrate. The mother liquor from the potassium sulfate which was separated in filter $c$ is cooled in the cooling device $g$, whereupon ammonium chloride is precipitated which is filtered off in filter $h$. The mother liquor therefrom, which contains free ammonia and now less ammonium chloride, is saturated with carbonic acid in vessel $i$ whereby the above mentioned solution, containing ammonium carbonate and ammonium chloride wherein the gypsum is stirred, is obtained.

Having now particularly described and ascertained the nature of my said invention and in what manner the same is to be performed, I declare that what I claim is:

1. A process for the production of potassium nitrate, consisting in stirring a liquor consisting of ammonium carbonate and ammonium chloride, obtained in the process, with gypsum, also obtained in the process, treating the resulting liquor with calcium carbonate, treating the mixture obtained with potassium chloride and ammonia, separating off the resulting mixture of solid potassium sulphate and calcium carbonate, treating the same with nitric acid, thus obtaining gypsum and a solution of potassium nitrate, cooling the ammoniacal ammonium chloride liquor remaining after the separation of the said potassium sulphate and calcium carbonate mixture in order to remove a part of the ammonium chloride, treating the said liquor with carbonic acid for forming ammonium carbonate, and stirring the gypsum containing potassium sulphate obtained in the preparation of potassium nitrate into the solution of ammonium carbonate and ammonium chloride formed, and finally separating the potassium nitrate from the mother liquor.

2. A process as claimed in claim 1 and in which the greater part of the said potassium nitrate is separated out from the potassium nitrate liquor in solid form by cooling and the mother liquor is used for dissolving further quantities of potassium sulphate for the decomposition with nitric acid and calcium carbonate, as set forth.

In testimony whereof I have signed my name to this specification.

CARL THEODOR THORSSELL.